United States Patent [19]

Blain et al.

[11] Patent Number: 4,981,492

[45] Date of Patent: Jan. 1, 1991

[54] BORATED TRIAZOLE-SUBSTITUTED POLYALKENYL SUCCINIMIDES AS MULTIFUNCTIONAL LUBRICANT AND FUEL ADDITIVES

[75] Inventors: David A. Blain, Mt. Laurel; Angeline B. Cardis, Florence; Ronald J. Poole, Mullica Hill, all of N.J.

[73] Assignee: Mobil Oil Corporation, Fairfax, Va.

[21] Appl. No.: 449,188

[22] Filed: Dec. 13, 1989

[51] Int. Cl.$^5$ ................................................ C10L 1/22
[52] U.S. Cl. ...................................... 44/317; 548/110; 548/261; 548/518
[58] Field of Search ....................... 44/63, 76; 548/110

[56] References Cited

U.S. PATENT DOCUMENTS

| | | | |
|---|---|---|---|
| 3,254,025 | 5/1966 | Le Suer | 44/76 |
| 3,518,193 | 6/1970 | Cyba | 44/76 |
| 4,554,086 | 11/1985 | Karol et al. | 548/110 |
| 4,855,074 | 8/1987 | Papay et al. | 44/76 |
| 4,897,086 | 1/1990 | Blain et al. | 44/63 |

*Primary Examiner*—Olik Chaudhuri
*Assistant Examiner*—Jerry D. Johnson
*Attorney, Agent, or Firm*—A. J. McKillop; C. J. Speciale; H. M. Flournoy

[57] ABSTRACT

Disclosed is an additive for lubricant or fuel compositions comprising the boronated reaction product of polyalkenyl-substituted succinimides, aldehydes and triazoles.

26 Claims, No Drawings

BORATED TRIAZOLE-SUBSTITUTED POLYALKENYL SUCCINIMIDES AS MULTIFUNCTIONAL LUBRICANT AND FUEL ADDITIVES

NATURE OF THE INVENTION

This invention relates to lubricant and liquid fuel compositions. More specifically it is concerned with the borated reaction products of polyalkenyl-substituted succinimides, aldehydes, and triazoles useful as multifunctional detergents, dispersants, and antioxidants in lubricant compositions as well as fuel compositions.

BACKGROUND OF THE INVENTION

Impurities occuring due to the particular lubricant and/or fuel utilized in internal combustion and diesel engines can produce soluble and insoluble materials which can be responsible for deposits on vital engine parts. Other impurities may result from handling and the corrosion of storage vessels and may even be introduced by the refiner to prevent or solve other problems such as oxidation. These impurities can also result in the formation of deposits in the engine. The eventual result is poor engine performance with increased noise, starting problems and decreased power output and fuel economy. A primary purpose of this invention accordingly is to provide an additive for lubricants and liquid hydrocarbyl fuels, which will help reduce engine deposits and improve the stability and cleanliness of lube oil and fuel compositions.

Polyisobutenyl succinimides are well known in the art as detergent dispersant additives for lubricants. Post reaction of these succinimides to incorporate other functionality is also known; U.S. Pat. Nos. 4,636,322; 4,713,187; 4,713,191 and 4,747,964 are recent examples. The products described in these patents, however, do not contain triazoles, which are known to possess several properties such as anti-corrosion, antiwear, metal passivation, etc. These properties will also be exhibited by the products of this patent application which contain triazoles. The incorporated boron will add additional layers of multifunctionality to the product, for example friction reducing properties. The multifunctional additives described below have applications in mineral and synthetic oils as well as in greases and fuels. However, no art is known to applicants which discloses or suggests borated triazole-substituted polyalkenyl succinimides as multifunctional lubricant or fuel additives.

SUMMARY OF THE INVENTION

Briefly stated this invention comprises a lubricant composition or fuel containing a major portion of a lubricant or fuel and a minor portion of an additive which is the borated reaction product of a polyalkenyl-substituted succinimide, an aldehyde, and a triazole. The invention further comprises the method for making the additive composition. The additive itself is a multifunctional additive having detergent/dispersant, anti-rust, anti-wear, and friction reducing activity.

DESCRIPTION OF THE INVENTION

As indicated above this invention comprises a lubricant or liquid hydrocarbyl fuel composition containing the borated reaction product of a polyalkenyl-substituted succinimide, an aldehyde, and a triazole. The substituted or modified succinimides have the following generalized structural formula:

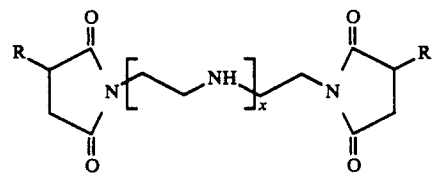

where R is an alkyl or alkenyl group of 9 to 150 carbon atoms, and X is 1 to 4. Although polyisobutylene is a particularly preferred substituent, other non-limiting substituents are polypropylene, other polyolefins, as well as monomeric olefins.

The triazoles have the following generalized structural formula:

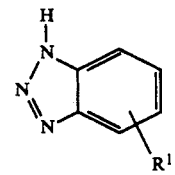

where $R^1$ is hydrogen or an alkyl, aryl, arylalkyl, or alkylaryl group of 1 to 12 carbon atoms. A preferred triazole is tolyltriazole.

The aldehyde used in preparing the reaction product can be alkyl, aryl, alkylaryl, or arylalkyl containing 1 to 12 carbon atoms. Included are benzaldehyde, salicylaldehyde, and 2-ethylhexanal. Also included are formaldehyde and paraformaldehyde which is more preferred.

Triazoles are attached to alkyl succinimides using an aldehyde as shown below in the suggested, but not limiting, structure. The polyalkenyl-substituted succinimide, aldehyde, and triazole are reacted preferably at a temperature of 100° C. to 200° C. at ambient pressure. If desired the reaction can be conducted in a carrier solvent such as xylene or toluene and in a non-reactive atmosphere. Although we do not wish to be bound by it, it is thought that the non-borated reaction product may have the below generalized structural formula:

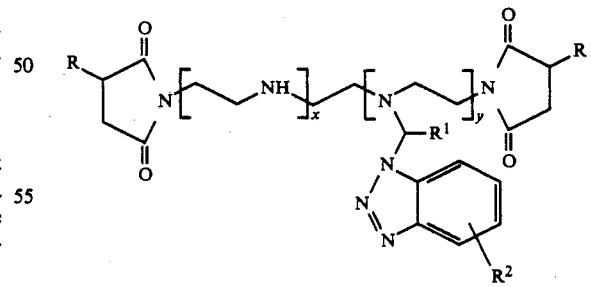

where R is an alkyl or alkenyl group of 9 to 150 carbon atoms, $R^1$ and $R^2$ are each hydrogen or an alkyl, aryl, arylalkyl, alkylarlyl group of 1 to 12 carbon atoms, y is greater than 0, and x+y is equal to 1 to 4.

The amines used to make the succinimides include but are not limited to poly(ethyleneamines) such as diethylene triamine, triethylene tetramine, tetraethylene pentamine, and pentaethylene hexamine. Other polyamines such as poly(propyleneaminesl and other amines which contain at least three nitrogens, each of which being primary or secondary can be used.

The reaction products described above are then borated by reaction with boric acid or other suitable borating agent to add additional desirable properties. However, the borating agent may be added to the reaction at any convenient point. Suitable borating agents in addition to boric acid include metaborates, trialkyl borates, borate esters or any suitable boronating agent known in the art. An excess of boronating or borating agent may be used if desired. Generally speaking, the substituted succinimide, aldehyde, triazole and boronating agent are reacted in a mole ratio respectively of 1:0.1:0.1:0.1 and 1:4:4:4, preferably 1:1:1:1 to 1:2:2:2.

In preparing a suitable lubricant composition the additive is added at a rate of between about 0.01% to 10% by weight of the total composition. The additive is added to fuel in range of 25-1000 pounds per thousand barrels of fuel.

It is to be understood that the compositions described herein can also contain other materials. For example, corrosion inhibitors, co-antioxidants, and the like can be used.

In general, the mineral oils, both paraffinic, naphthenic and mixtures thereof, employed as a lubricating oil or as the grease vehicle, can be of any suitable lubricating viscosity range, as for example, from about 45 SSU at 100° F. to about 6000 SSU at 100° F., and preferably from about 50 to about 250 SSU at 210° F. These oils may have viscosity indexes ranging to 100 or higher. Viscosity indexes from about 70 to about 95 are preferred. The average molecular weights of these oils can range from about 250 to about 800.

Where the lubricant is employed as a grease, the lubricating oil is generally used in an amount sufficient to balance the total grease composition, after accounting for the desired quantity of the thickening agent, and other additive components included in the grease formulation. A wide variety of materials can be employed as thickening or gelling agents. These can include any of the conventional metal salts or soaps, such as calcium, or lithium stearates or hydroxystearates, which are dispersed in the lubricating vehicle in grease-forming quantities in an amount to impart to the resulting grease composition the desired consistency. Other thickening agents that can be employed in the grease formulation comprise the non-soap thickeners, such as surface-modified clays and silicas, aryl ureas, calcium complexes and similar materials. In general, grease thickeners can be employed which do not melt and dissolve when used at the required temperature within a particular environment; however, in all other respects, any material which is normally employed for thickening or gelling hydrocarbon fluids for forming grease can be used in preparing the aforementioned improved grease in accordance with the present invention.

In instances where synthetic oils, or synthetic oils employed as the vehicle for the grease, are desired in preference to mineral oils, or in preference to mixtures of mineral and synthetic oils, various synthetic oils may be utilized successfully. Typical synthetic oil vehicles include polyisobutylenes, polybutenes, hydrogenated polydecenes, polypropylene glycol, polyethylene glycol, trimethylol propane esters, neopentyl and pentaerythritol esters, di(2-ethylhexyl) sebacate, di(2-ethylhexyl) adipate, dibutyl phthalate, fluorocarbons, silicate esters, silanes, esters of phosphorus containing acids, liquid ureas, ferrocene derivatives, hydrogenated synthetic oils, chain-type polyphenyls, siloxanes and silicones (polysiloxanes) and alkyl-substituted diphenyl ethers typified by a butyl-substituted bis(p-phenoxy phenyl) ether, and phenoxy phenylethers.

It is to be understood that the grease compositions described herein can also contain other materials, e.g., corrosion inhibitors, extreme pressure agents, viscosity index improvers, antioxidants, antiwear agents and the like can be used. These include, but are not limited to, phenates, sulfonates, succinimides, zinc dialkyl or diaryl dithiophosphates, and the like.

Suitable liquid fuels include liquid hydrocarbon fuels or oxygenated fuels. Accordingly, these hydrocarbyl or hydrocarbyloxy fuels include gasoline, fuel oils, diesel oils and alcohol fuels such as methyl and ethyl alcohol, gasohol and ethers and mixtures thereof.

EXAMPLE 1

6.7 gm (0.05 mole) of tolyltriazole, 146.5 gm (0.05 mole) of a polyisobutenyl succinimide (the reaction product of tetraethylene pentamine and a polyisobutenyl succinic anhydride which is the reaction product of maleic anhydride and a 920 MW polyisobutylene), and 150 ml of toluene were charged to a 1000 ml reactor equipped with an $N_2$ inlet, mechanical stirrer, thermometer, and a Dean Stark trap. The temperature was raised to 75° C. and 1.5 gm (0.05 mole) paraformaldehyde was added. The reaction was brought to reflux. After five hours at 135° C., 1.0 ml of water had been collected. The reaction was cooled to room temperature and 3.1 g (0.05 mole) boric acid and 50 ml toluene were added. The mixture was brought to reflux. After three hours at 125° C., 1.3 ml of water had been collected. The reaction was filtered through a bed of celite and the solvent was removed by rotary evaporation. The resultant vary viscous brown product contained 0.24% boron.

EXAMPLE 2

The procedure from Example 1 was followed with the following exception: The polyisobutenyl siccinimide to tolytriazole to paraformaldehyde to boric acid was changed from 1:1:1:1 to 1:2:2:2. The resultant product contained 0.29% boron.

EXAMPLE 3

The procedure from Example 1 was followed with the following exception: The polyisobutenyl siccinimide used was made from a 460 MW polyisobutylene. The resultant product contained 0.54% boron.

EVALUATION

The following examples were evaluated in the B-10 Oxidation Test to show the antioxidant capabilites of these multifunctional additives at 1% level in a solvent paraffinic neutral base oil. The Oxidation Test may be summarized as follows: Basically the lubricant is subjected to a stream of air which is bubbled through the oil formulation at the rate of five liters per hour at 325° F. for 40 hours. Present in the composition are samples of metals commonly used in engine construction, namely iron, copper, aluminum and lead, see U.S. Pat. No. 3,682,980 incorporated herein by reference for further details.

B-10 Catalytic Oxidation Test
325° F., 40 Hours

| B-10 Catalytic Oxidation Test 325° F., 40 Hours | |
|---|---|
| Item | % Δ KV |
| Base Oil (100% solvent paraffinic neutral mineral oil) | 136.0 |
| 1% Example 1 in above base oil | 92.7 |
| 1% Example 3 in above base oil | 70.1 |

The test data clearly documents the improved products and compositions of the present invention.

We claim:

1. The reaction product obtained by reacting a polyalkenyl-substituted succinimide, a triazole, and an aldehyde and thereafter boronating the resultant intermediate product and wherein the polyalkenyl-substituted succinimide, aldehyde, triazole and boronating agent are reacted in a mole ratio of succinimide to aldehyde to triazole to boronating agent respectively of between about 1:0.1:0.1:0.1 and about 1:4:4:4. and wherein the reaction is conducted at a temperature of about 100°C. to about 200° C. at ambient pressure.

2. The reaction product obtained by reacting a polyalkenyl-substituted succinimide having the following generalized structural formula:

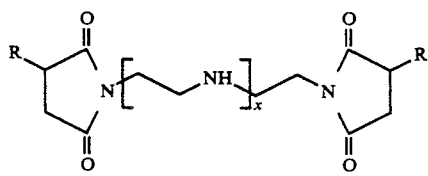

where R is an alkyl or alkenyl group of 9 to 150 carbon atoms, and x is 1 to 4 with a triazole having the generalized structural formula:

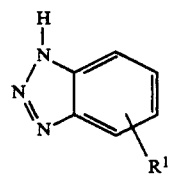

where $R^1$ is hydrogen or an alkyl, aryl, arylalkyl, or alkylaryl group of 1 to 12 carbon atoms with an aldehyde and thereafter boronating the resultant product.

3. The reaction product of claim 2 wherein the polyalkenyl-substituted succinimide is a polyisobutenyl succinimide.

4. The reaction product of claim 2 wherein the triazole is tolyltriazole.

5. The reaction product of claim 2 wherein the aldehyde is selected from the group consisting of formaldehyde, paraformaldehyde, benzaldehyde, salicylaldehyde, and 2-ethylhexanal.

6. The reaction product of claim 5 wherein the aldehyde is paraformaldehyde.

7. The reaction product of claim 2 wherein the boronating agent is selected from boric acid, metaborates or trialkyl borates.

8. The reaction product of claim 7 wherein the boronating agent is boric acid.

9. The reaction product of claim 2 wherein the unborated intermediate reaction product has the following generalized structural formula:

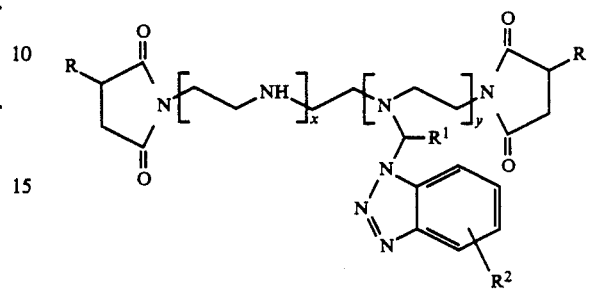

where R is an alkyl or alkenyl group of 9 to 150 carbon atoms, $R^1$ and $R^2$ are each hydrogen or an alkyl, aryl, arylalkyl, alkylaryl group of 1 to 12 carbon atoms, y is greater than 0, and x+y is equal to 1 to 4.

10. The reaction product of claim 1 wherein the polyalkenyl-substituted succinimide, aldehyde, triazole and boronating agent are reacted in a mole ratio of succinimide to aldehyde to triazole to boronating agent respectively of between about 1:1:1:1 and about 1:2:2:2.

11. The reaction of product of claim 2 wherein the reaction is conducted in an inert hydrocarbon solvent selected from the group consisting of xylene, mixed xylenes and toluene.

12. A fuel composition comprising a major portion of a liquid hydrocarbyl or hydrocarbyloxy fuel and a minor portion of from about 25 to about 1000 pounds per thousand barrels of fuel of the total composition of the borated reaction product of claim 2.

13. A method for making a fuel composition comprising adding to a liquid hydrocarbyl or hydrocarbyloxy fuel between about 25 to 1000 pounds by weight of the total composition of the additive product of claim 1 per 1000 barrels of fuel.

14. A fuel composition comprising a major portion of a liquid hydrocarbyl or hydrocarbyloxy fuel and a minor portion of from about 25 to about 1000 pounds per thousand barrels of fuel of the total composition of a borated reaction product obtained by reacting a polyalkenyl-substituted succinimide having the following generalized structural formula:

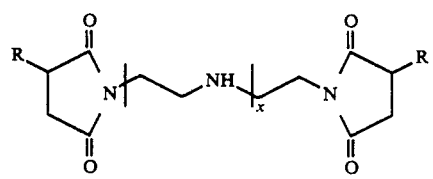

where R is an alkyl or alkenyl group of 9 to 150 carbon atoms, and x is 1 to 4 with a triazole having the following generalized structural formula:

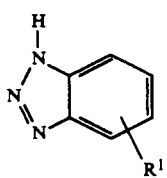

where $R^1$ is hydrogen or an alkyl, aryl, arylalkyl, or alkylaryl group of 1 to 12 carbon atoms with an aldehyde and thereafter reacting with a boronating agent in a mole ratio of succinimide to aldehyde to triazole to boronating agent respectively of between about 1:0.1:0.1:0.1 and about 1:4:4:4 at a temperature of about 100° C. to about 200° C. at ambient pressure.

15. The fuel composition of claim 14 wherein said liquid fuel is selected from gasoline, fuel oils, diesel oil and alcohol, gasohol and ether fuels, and mixtures thereof.

16. The composition of claim 14 wherein the polyalkenyl-substituted succinimide is a polyisobutenyl succinimide.

17. The composition of claim 14 wherein the trizaole is tolytriazole.

18. The composition of claim 14 wherein the aldehyde is selected from the group consisting of formaldehyde, paraformaldehyde, benzaldehyde, salicylaldehyde and 2-ethylhexanal.

19. The composition of claim 18 wherein the aldehyde is paraformaldehyde.

20. The composition of claim 14 wherein the boronating agent is selected from boric acid, metaborates or trialkyl borates.

21. The composition of claim 20 wherein the boronating agent is boric acid.

22. The composition of claim 14 wherein the unborated reaction product had the following generalized structural formula:

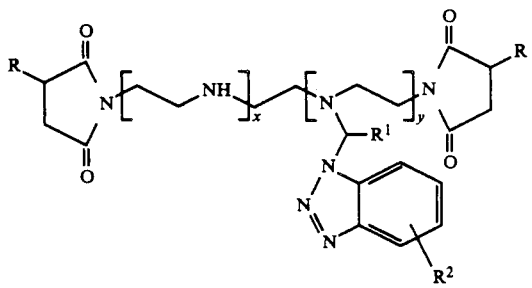

where R is an alkyl or alkenyl group of 9 to 150 carbon atoms, $R^1$ and $R^2$ are each hydrogen or an alkyl, aryl, arylalkyl, alkylarlyl group of 1 to 12 carbon atoms, y is greater than 0, and x+y is equal to 1 to 4.

23. The composition of claim 14 wherein the succinimide, aldehyde, triazole and boronating agent are reacted in a mole ratio of succinimide, aldehyde, triazole and boronating agent respectively of between about 1:1:1:1 and about 1:2:2:2.

24. The composition of claim 14 wherein the reaction is conducted in a carrier solvent selected from the group consisting of xylene and toluene.

25. The fuel composition of claim 15 wherein said fuel is a gasoline. cm 26. The fuel congestion of claim 15 wherein said fuel is a diesel fuel.

26. The fuel congestion of claim 15 wherein said fuel is a diesel fuel.

* * * * *